United States Patent
Hiraki et al.

(10) Patent No.: US 11,977,282 B2
(45) Date of Patent: May 7, 2024

(54) OPTICAL MODULATOR

(71) Applicant: Nippon Telegraph and Telephone Corporation, Tokyo (JP)

(72) Inventors: Tatsuro Hiraki, Tokyo (JP); Shinji Matsuo, Tokyo (JP); Tai Tsuchizawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 274 days.

(21) Appl. No.: 17/619,679

(22) PCT Filed: Jul. 2, 2019

(86) PCT No.: PCT/JP2019/026255
§ 371 (c)(1),
(2) Date: Dec. 16, 2021

(87) PCT Pub. No.: WO2021/001918
PCT Pub. Date: Jan. 7, 2021

(65) Prior Publication Data
US 2022/0357604 A1    Nov. 10, 2022

(51) Int. Cl.
*G02F 1/025* (2006.01)
*G02F 1/015* (2006.01)

(52) U.S. Cl.
CPC .......... *G02F 1/025* (2013.01); *G02F 1/0156* (2021.01); *G02F 2202/103* (2013.01); *G02F 2202/105* (2013.01)

(58) Field of Classification Search
None
See application file for complete search history.

(56) References Cited

U.S. PATENT DOCUMENTS

| | | |
|---|---|---|
| 2012/0033910 A1 | 2/2012 | Morini et al. |
| 2016/0291350 A1 | 10/2016 | Fujikata et al. |
| 2016/0357035 A1 | 12/2016 | Kamei et al. |
| 2017/0045762 A1 | 2/2017 | Huang et al. |
| 2020/0124795 A1 | 4/2020 | Cherchi et al. |
| 2020/0200969 A1 | 6/2020 | Gardes et al. |

FOREIGN PATENT DOCUMENTS

| | | |
|---|---|---|
| JP | 2012521576 A | 9/2012 |
| WO | 2014155450 A1 | 10/2014 |
| WO | 2015129039 A1 | 9/2015 |
| WO | 2018193167 A1 | 10/2018 |
| WO | 2018224621 A1 | 12/2018 |

OTHER PUBLICATIONS

Narayanan et al. "Broadband all-optical modulation in hydrogenated amorphous silicon waveguides" Optic Express, May 10, 2010, vol. 18, No. 10, pp. 9809-9814.

*Primary Examiner* — Chad H Smith
(74) *Attorney, Agent, or Firm* — SLATER MATSIL, LLP

(57) ABSTRACT

A core, constituted by an amorphous undoped semiconductor (i type), which is formed on a lower clad layer, and a p-type layer and an n-type layer which are disposed on the lower clad layer with the core interposed therebetween and are formed in contact with the core are provided. The core is formed to be thicker than the p-type layer and the n-type layer. The p-type layer and the n-type layer are constituted by single crystal silicon.

10 Claims, 12 Drawing Sheets

OPTICAL MODULATOR

CROSS-REFERENCE TO RELATED APPLICATIONS

This application is a national phase entry of PCT Application No. PCT/JP2019/026255, filed on Jul. 2, 2019, which application is hereby incorporated herein by reference.

TECHNICAL FIELD

The present invention relates to an optical modulator.

BACKGROUND

A technique for manufacturing optical modulation elements (optical modulators) on silicon substrates has attracted much attention in order to reduce the cost of optical integrated circuits. In general, the intensity and phase of light are modulated using a carrier plasma effect in silicon optical modulators. In particular, silicon optical modulators that modulate a light intensity are expected to generate an intensity modulation signal and to be applied to various communication devices such as optical switches and variable optical attenuators. A silicon carrier injection type element known as a representative intensity modulation element is configured as a rib type waveguide including slabs on both sides of a core of which the cross-sectional shape is a rectangular shape.

The element will be described with reference to FIG. 7. In the element, a p-type region 303 and an n-type region 304 are formed in slabs on both sides of a core 302 of a rib type waveguide formed on a lower clad layer 301, and a p-i-n diode is formed in a horizontal direction. A p-electrode 305 is connected to the p-type region 303, and an n electrode 306 is connected to the n-type region 304. In addition, an upper clad layer 307 is formed on the core 302. It is possible to attenuate the intensity of light guided through an optical waveguide by the core 302 by applying a forward bias between the p-type region 303 and the n-type region 304 of the element and injecting free carriers into the core 302.

Power consumption of the above-described intensity modulator is proportional to the square of the amount of current injected, and thus it is necessary to reduce a required amount of current injected in order to achieve low power consumption. The amount of current injected is determined according to a free carrier absorption coefficient that is inversely proportional to the mobility of carriers in a material. An amorphous semiconductor such as amorphous silicon (a-Si) has been proposed as such a type of low mobility material (see NPL 1).

CITATION LIST

Non Patent Literature

NPL 1—K. Narayanan et al., "Broadband all-optical modulation in hydrogenated-amorphous silicon waveguides", Optics Express, vol. 18, no. 10, pp. 9809-9814, 2010.

SUMMARY

Technical Problem

However, since an amorphous semiconductor has a low mobility of carriers, the manufacture of the above-described diode structure using only an amorphous semiconductor increases element resistance, which results in an increase in power consumption.

Embodiments of the present invention are contrived to solve the above-described problems, and an object thereof is to curb an increase in element resistance of an optical modulator to reduce the amount of current injected.

Means for Solving the Problem

An optical modulator according to embodiments of the present invention includes a core, constituted by an amorphous semiconductor, which is formed on a clad layer, and a p-type layer and an n-type layer which are disposed on the clad layer with the core interposed therebetween and are formed in contact with the core, in which the p-type layer and the n-type layer are constituted by single crystal silicon.

Effects of Embodiments of the Invention

As described above, according to embodiments of the present invention, a core is constituted by an amorphous semiconductor, and a p-type layer and an n-type layer are constituted by single crystal silicon, and thus it is possible to reduce the amount of current injected by curbing an increase in element resistance of an optical modulator.

DETAILED DESCRIPTION OF ILLUSTRATIVE EMBODIMENTS

Figure 1:
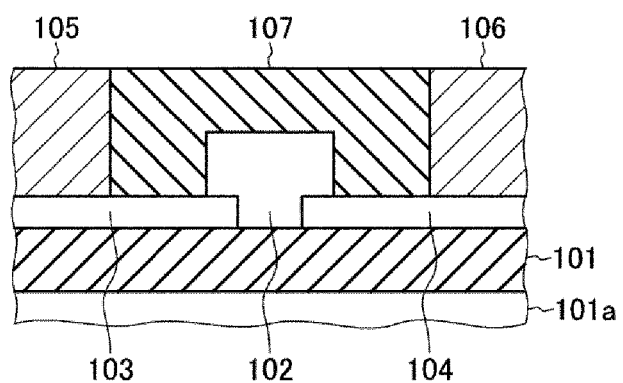
FIG. 1 is a cross-sectional view illustrating a configuration of an optical modulator according to an embodiment of the present invention.

Hereinafter, an optical modulator according to embodiment of the present invention will be described with reference to FIG. 1. The optical modulator includes a core 102 constituted by an amorphous undoped semiconductor (i type), and a p-type layer 103 and an n-type layer 104 which are disposed with the core 102 interposed therebetween and are formed in contact with the core 102, and the core 102, the p-type layer 103, and the n-type layer 104 are formed on a lower clad layer 101. The core 102 is formed to be thicker than the p-type layer 103 and the n-type layer 104. The p-type layer 103 and the n-type layer 104 are constituted by single crystal silicon.

The core 102 can be formed of, for example, amorphous silicon. In addition, the core 102 can also be constituted by amorphous silicon (a-Si: H, a-Si: D) containing silicon with defects terminated with hydrogen or deuterium. These materials have a track record of having been used in applications such as solar cells, and have been reported to have lower mobilities than single crystal silicon.

In addition, the optical modulator includes a p-electrode 105 formed on the p-type layer 103, and an n electrode 106 formed on the n-type layer 104. The p-electrode 105 is ohmic-connected to the p-type layer 103, and the n electrode 106 is ohmic-connected to the n-type layer 104.

Meanwhile, the lower clad layer 101 is formed on a substrate Iola formed of, for example, silicon. In addition, the upper clad layer 107 is formed on the core 102. For example, this embedded insulating layer can be configured as the lower clad layer 101 using a well-known silicon-on-insulator (SOI) substrate. In addition, patterns of the p-type layer 103 and the n-type layer 104 can be formed by patterning a surface silicon layer of an SOI substrate by a known pattern formation technique. In addition, the p-type layer 103 and the n-type layer 104 can be configured by respectively implanting p-type impurities and n-type impurities into the patterns by a known ion implantation technique.

In addition, the core 102 can be formed by depositing silicon on the lower clad layer 101 on which the p-type layer 103 and the n-type layer 104 are formed by a well-known deposition technique such as a chemical vapor deposition method or a spattering method to form an amorphous silicon film and patterning the amorphous silicon film by a known pattern formation technique. In addition, the p-electrode 105 and the n electrode 106 can be formed by a known lithography method or the like.

When a forward bias voltage is applied between the p-electrode 105 and the n electrode 106 of the optical modulator according to the above-described embodiment, free carriers are injected into the core 102 through the p-type layer 103 and the n-type layer 104 which are formed of low resistance single crystal silicon. Light being guided is strongly trapped in the core 102 which constitutes an optical waveguide, and the intensity of the light being guided can be modulated by the injection of the above-described free carriers. Meanwhile, light to be modulated is guided in a direction from the side in front to the side behind the paper of FIG. 1. According to the embodiment, since the core 102 is constituted by an amorphous semiconductor, the amount of absorption of free carriers in the core 102 is large, and thus it is possible to reduce the amount of current injected. On the other hand, the p-type layer 103 and the n-type layer 104 are constituted by low resistance single crystal silicon, and thus it is possible to curb an increase in element resistance.

Figure 2:
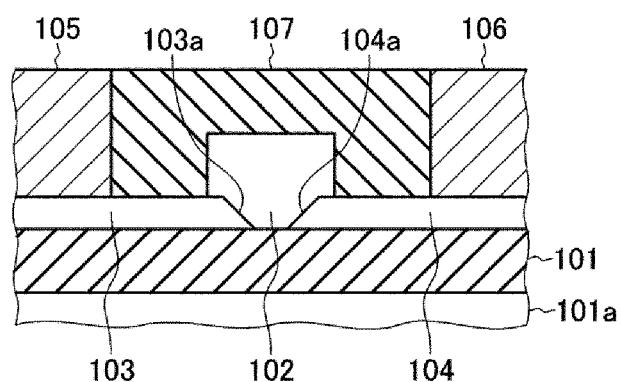
FIG. 2 is a cross-sectional view illustrating a configuration of another optical modulator according to the embodiment of the present invention.

Meanwhile, as illustrated in FIG. 2, an angle formed by a side surface 103a of the p-type layer 103 on the core 102 side and a side surface 104a of the n-type layer 104 on the core 102 side with respect to a plane of the lower clad layer 101 can also be an acute angle.

As known well, the solubility (etching rate) of single crystal silicon in an alkaline etching solution differs depending on a crystal plane, and a (iii) plane is less likely to be etched than a (100) plane. Thus, the side surface 103a and the side surface 104a can be formed as the above-described inclined surfaces by setting the (100) plane to be a main surface and setting the (iii) plane to be the side surface 103a and the side surface 104a by wet etching to form the p-type layer 103 and the n-type layer 104. In addition, a surface formed by wet etching is flat and has few defects as compared with a case where dry etching is used. Further, in general, in the deposition of an amorphous semiconductor using a chemical vapor deposition method or a sputtering method, an inclined surface that can be seen from above has a better covering property than a vertical side surface.

As described above, the side surface 103a of the p-type layer 103 and the side surface 104a of the n-type layer 104 which are in contact with the core 102 are formed as the above-described inclined surfaces, and thus a heterojunction therebetween is formed in better conditions.

Figure 3:
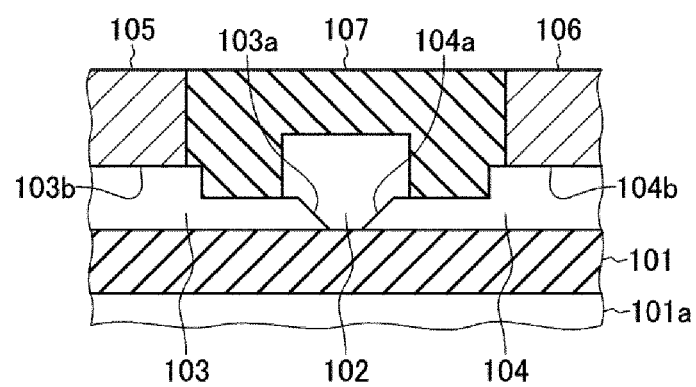
FIG. 3 is a cross-sectional view illustrating a configuration of still another optical modulator according to the embodiment of the present invention.

In addition, as illustrated in FIG. 3, the thickness of the p-type layer 103b in which the p-electrode 105 is formed and the thickness of the n-type layer 104b in which the n electrode 106 is formed can also be made larger than those of the p-type layer 103 and the n-type layer 104 in a region in contact with the core 102. With such a configuration, the p-electrode 105 and the n electrode 106 can be further separated from a light trapping region centered on the core 102 in a cross-sectional view, and the resistance of the element can be reduced without impairing light trapping.

Incidentally, the optical modulator is used by being optically connected (optical connection) to another optical waveguide. Hereinafter, an optical connection structure between the optical modulator and another optical waveguide will be described.

Figure 4A:
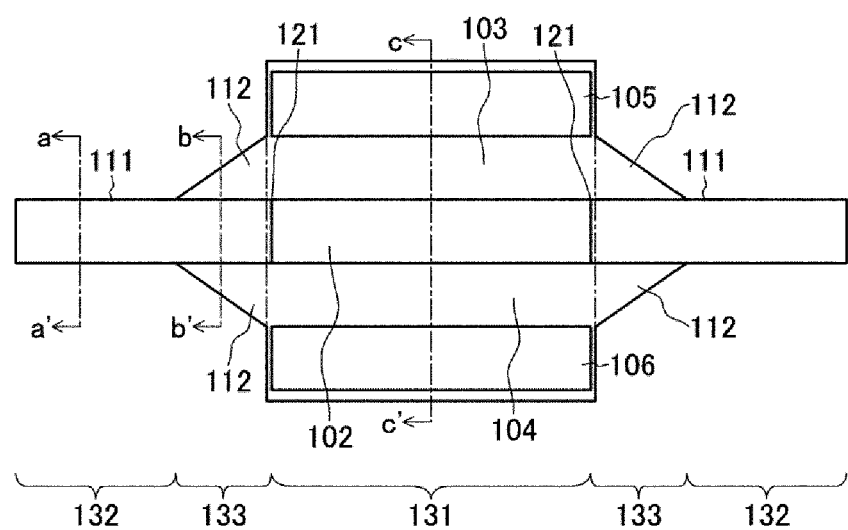
FIG. 4A is a plan view illustrating a configuration of still another optical modulator according to the embodiment of the present invention.
Figure 4B:
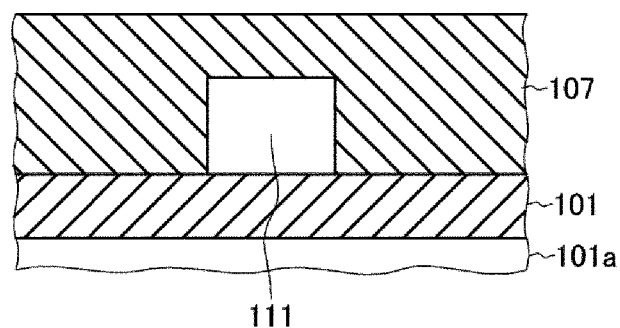
FIG. 4B is a cross-sectional view illustrating a partial configuration of still another optical modulator according to the embodiment of the present invention.
Figure 4C:
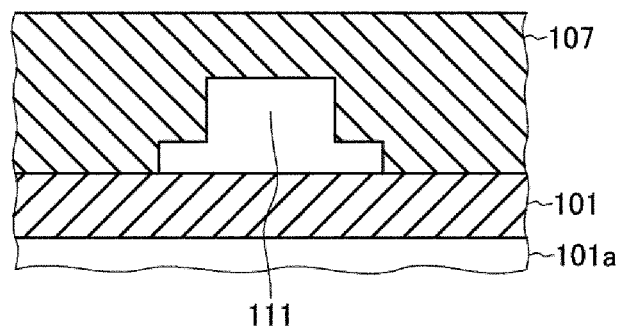
FIG. 4C is a cross-sectional view illustrating a partial configuration of still another optical modulator according to the embodiment of the present invention.

For example, as illustrated in FIGS. 4A, 4B, and 4C, an optical waveguide 131 constituted by the core 102 of the optical modulator and another optical waveguide 132 can be optically connected through an optical connection portion 133. FIG. 4B illustrates a cross-section taken along a line aa' in FIG. 4A, and FIG. 4C illustrates a cross-section taken along a line bb' in FIG. 4A. Meanwhile, a cross-section of a line cc' in FIG. 4A is illustrated in FIG. 1.

The other optical waveguide 132 includes another core 111, constituted by single crystal silicon, which is formed on the lower clad layer 101. The other core 111 is constituted by an undoped region of a silicon layer formed to be continuous with the p-type layer 103 and the n-type layer 104. The other core 111 is formed to have the same thickness and the same width as the core 102, and the end face of the core 111 is connected in the connection portion 121. The optical connection portion 133 includes a slab 112 which is continuous with the p-type layer 103 and the n-type layer 104. In the optical connection portion 133, the other core 111 is inserted into the slab 112. The width of the slab 112 decreases as a distance from the optical waveguide 131 increases when seen in a plan view, and there is no width of the slab in the other optical waveguide 132.

Figure 5A:
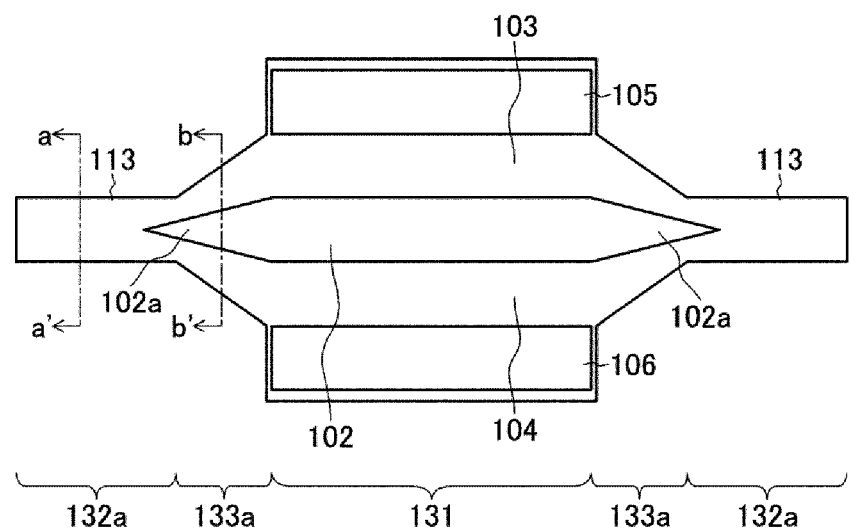
FIG. 5A is a plan view illustrating a configuration of still another optical modulator according to the embodiment of the present invention.
Figure 5B:
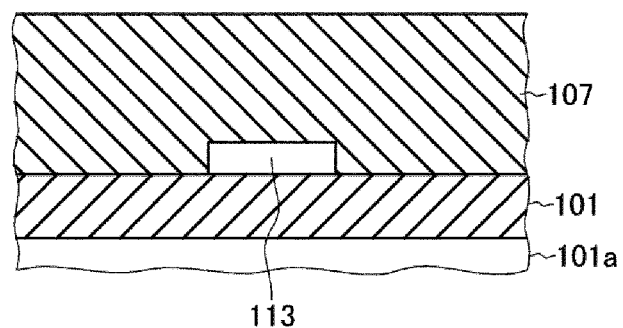
FIG. 5B is a cross-sectional view illustrating a partial configuration of still another optical modulator according to the embodiment of the present invention.
Figure 5C:
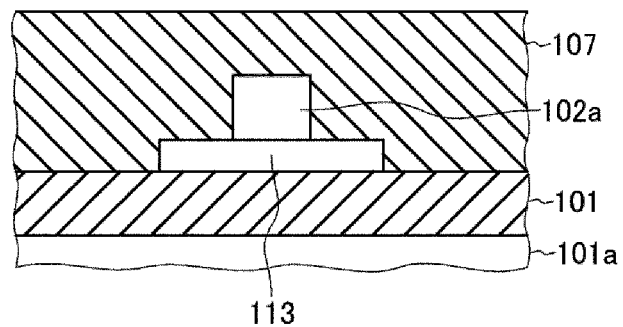
FIG. 5C is a cross-sectional view illustrating a partial configuration of still another optical modulator according to the embodiment of the present invention.

In addition, as illustrated in FIGS. 5A, 5B, and 5C, the optical waveguide 131 constituted by the core 102 of the optical modulator and the other optical waveguide 132a can be optically connected to each other through an optical connection portion 133a. FIG. 5B illustrates a cross-section taken along a line aa' in FIG. 5A, and FIG. 5C illustrates a cross-section taken along a line bb' in FIG. 5A.

The other optical waveguide 132a includes another core 113, constituted by single crystal silicon, which is formed on the lower clad layer 101. The other core 113 is constituted by an undoped region of a silicon layer formed to be continuous with the p-type layer 103 and the n-type layer 104. Further, in this example, the other core 113, the p-type layer 103, and the n-type layer 104 are formed to have the same thickness. In addition, the width of the other core 113 decreases as a distance from the optical waveguide 131 increases in the optical connection portion 133a when seen in a plan view, and the other core 113 has the same width as a main portion of the core 102 in the other optical waveguide 132a when seen in a plan view.

In addition, the core 102 includes an extending portion iota extending to the other optical waveguide 132a side and formed on the other core 113. In addition, the width of the extending portion iota decreases as a distance from the optical waveguide 131 increases.

Figure 6A:
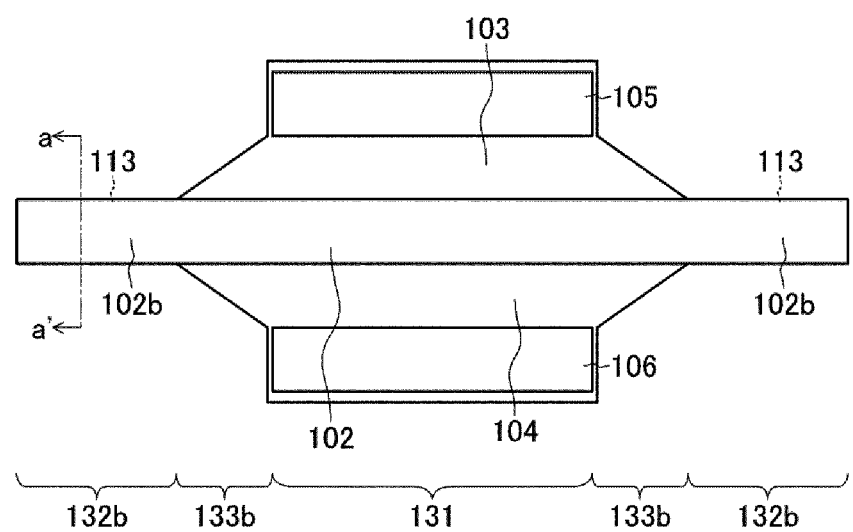
FIG. 6A is a plan view illustrating a configuration of still another optical modulator according to the embodiment of the present invention.
Figure 6B:
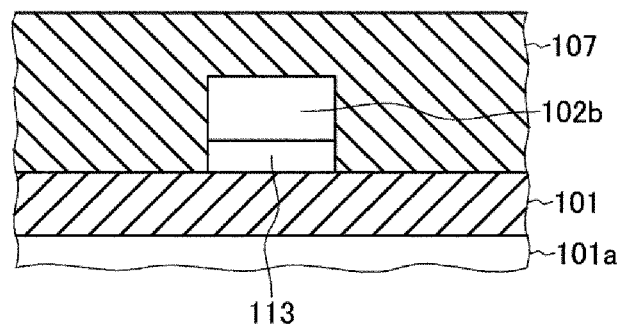
FIG. 6B is a cross-sectional view illustrating a partial configuration of still another optical modulator according to the embodiment of the present invention.
Figure 7:
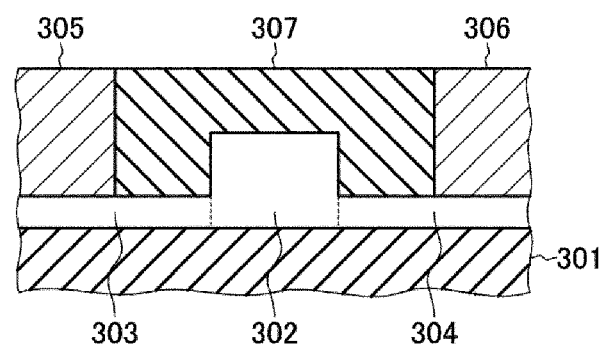
FIG. 7 is a cross-sectional view illustrating a configuration of an optical modulator.

In addition, as illustrated in FIGS. 6A and 6B, the optical waveguide 131 constituted by the core 102 of the optical modulator and the other optical waveguide 132b can be optically connected to each other through an optical connection portion 133b. FIG. 6B illustrates a cross-section taken along a line aa' in FIG. 6A.

The other optical waveguide 132a includes another core 113, constituted by single crystal silicon, which is formed on the lower clad layer 101. The other core 113 is constituted by an undoped region of a silicon layer formed to be continuous with the p-type layer 103 and the n-type layer 104. Further, in this example, the other core 113, the p-type layer 103, and the n-type layer 104 are formed to have the same thickness. In addition, the width of the other core 113 decreases as a distance from the optical waveguide 131 increases in the optical connection portion 133a when seen in a plan view, and the other core 113 has the same width as a main portion of the core 102 in the other optical waveguide 132a when seen in a plan view.

In addition, the core 102 includes an extending portion 102b extending to the other optical waveguide 132a side and formed on the other core 113. The extending portion 102b has the same width as the core 102 when seen in a plane view.

As described above, according to embodiments of the present invention, the core is constituted by an amorphous semiconductor, and the p-type layer and the n-type layer are constituted by single crystal silicon, and thus it is possible to reduce the amount of current injected by curbing an increase in element resistance of the optical modulator.

Meanwhile, the present invention is not limited to the above-described embodiment, and it is apparent that various modifications and combinations can be made by one skilled in the art within a technical idea of the present invention. For example, the configuration described using FIGS. 2 and 3 can be adopted in the portions of the optical waveguide 131 illustrated in FIGS. 4A, 5A, and 6A.

REFERENCE SIGNS LIST

101 Lower clad layer
101a Substrate
102 Core
103 p-type layer
104 n-type layer
105 p-electrode
106 n-electrode
106, 107 Upper clad layer.

The invention claimed is:

1. An optical modulator comprising:
a core, wherein the core is constituted by an amorphous semiconductor on a clad layer;
a p-type layer and an n-type layer on the clad layer with the core interposed therebetween, wherein the p-type layer and the n-type layer contact the core, and wherein the p-type layer and the n-type layer are constituted by single crystal silicon; and
a second optical waveguide configured to be optically connected to a first optical waveguide constituted by the core, wherein a second core constituting the second optical waveguide is constituted by a silicon layer that is continuous with the p-type layer and the n-type layer.

2. The optical modulator according to claim 1, wherein an angle defined by side surfaces of the p-type layer and the n-type layer on a core side with respect to a plane of the clad layer is an acute angle.

3. The optical modulator according to claim 1, further comprising:
a p-type electrode on a first portion of the p-type layer; and
an n-type electrode on a first portion of the n-type layer, wherein the first portion of the p-type layer and the first portion of the n-type layer each have a thickness larger than respective thicknesses of a second portion of the p-type layer in contact with the core and a second portion of the n-type layer in contact with the core.

4. The optical modulator according to claim 1, wherein the core is constituted by amorphous silicon, and wherein the amorphous silicon contains silicon which is terminated with hydrogen or deuterium.

5. The optical modulator according to claim 1, wherein the core extends to a second optical waveguide side, and wherein an extending portion of the core is disposed on an other core.

6. The optical modulator according to claim 5, wherein a width of the extending portion of the core decreases as a distance from the first optical waveguide increases in a plan view.

7. A method comprising:
providing a core, wherein the core is constituted by an amorphous semiconductor on a clad layer; and
forming a p-type layer and an n-type layer on the clad layer with the core interposed therebetween, wherein the p-type layer and the n-type layer contact the core, and wherein the p-type layer and the n-type layer are constituted by single crystal silicon; and
providing a second optical waveguide configured to be optically connected to a first optical waveguide constituted by the core, wherein a second core constituting the second optical waveguide is constituted by a silicon layer that is continuous with the p-type layer and the n-type layer.

8. The method according to claim 7, wherein an angle defined by side surfaces of the p-type layer and the n-type layer on a core side with respect to a plane of the clad layer is an acute angle.

9. The method according to claim 7, further comprising:
forming a p-type electrode on a first portion of the p-type layer; and
forming an n-type electrode on a first portion of the n-type layer, wherein the first portion of the p-type layer and the first portion of the n-type layer each have a thickness larger than respective thicknesses of a second portion of the p-type layer in contact with the core and a second portion of the n-type layer in contact with the core.

10. The method according to claim 7, wherein the core is constituted by amorphous silicon, and wherein the amorphous silicon contains silicon which is terminated with hydrogen or deuterium.

* * * * *